US007299205B2

(12) United States Patent
Weinberger (10) Patent No.: US 7,299,205 B2
(45) Date of Patent: Nov. 20, 2007

(54) MUTUAL FUND ANALYSIS METHOD AND SYSTEM

(75) Inventor: Alan L. Weinberger, Reston, VA (US)

(73) Assignee: **G*G*S Systems, LLC**, Reston, VA (US)

(*) Notice: Subject to any disclaimer, the term of this patent is extended or adjusted under 35 U.S.C. 154(b) by 497 days.

(21) Appl. No.: 11/036,189

(22) Filed: Jan. 18, 2005

(65) Prior Publication Data

US 2005/0149424 A1  Jul. 7, 2005

Related U.S. Application Data

(63) Continuation-in-part of application No. 09/675,658, filed on Sep. 29, 2000, now abandoned.

(60) Provisional application No. 60/156,886, filed on Sep. 30, 1999.

(51) Int. Cl.
*G06Q 40/00* (2006.01)

(52) U.S. Cl. .................. 705/36 R; 705/37; 705/35

(58) Field of Classification Search ............. 705/36 R, 705/37, 35
See application file for complete search history.

(56) References Cited

U.S. PATENT DOCUMENTS

| | | |
|---|---|---|
| 5,745,383 A | 4/1998 | Barber |
| 5,761,442 A | 6/1998 | Barr et al. |
| 5,784,696 A | 7/1998 | Melnikoff |
| 5,812,987 A | 9/1998 | Luskin et al. |
| 5,819,238 A | 10/1998 | Fernholz |
| 5,884,285 A | 3/1999 | Atkins |
| 5,884,287 A | 3/1999 | Edesess |
| 5,911,135 A | 6/1999 | Atkins |
| 5,978,778 A | 11/1999 | O'Shaughnessy |
| 6,003,018 A | 12/1999 | Michaud et al. |
| 6,012,042 A | 1/2000 | Black et al. |
| 6,018,722 A | 1/2000 | Ray et al. |
| 6,078,904 A | 6/2000 | Rebane |
| 6,085,175 A | 7/2000 | Gugel et al. |
| 6,088,685 A | 7/2000 | Kiron et al. |
| 6,092,050 A | 7/2000 | Lungren et al. |
| 6,275,814 B1 * | 8/2001 | Giansante et al. ........ 705/36 R |
| 6,484,152 B1 | 11/2002 | Robinson |
| 2003/0074293 A1 | 4/2003 | Kiron et al. |

FOREIGN PATENT DOCUMENTS

WO    WO 9844444 A1 * 10/1998

* cited by examiner

*Primary Examiner*—Jagdish N Patel
(74) *Attorney, Agent, or Firm*—Nixon & Vanderhye P.C.

(57) ABSTRACT

A method and system for comparing, ranking, selecting and tracking mutual funds provides a statistical analysis based on past history to facilitate the investment process. The comparing analysis incorporates a determination of power spectral density of each respective fund using a principal factor such as cumulative growth and stability. For tracking investments, upper and lower control limits are defined according to standard deviations of average total return over predetermined periods of time to improve chances of the investor achieving a profit as well as a near optimum performance. The power spectral density analysis provides a clear indication of comparative mutual fund performance.

24 Claims, 4 Drawing Sheets

S & P 500 and the Top 5 Funds *
1983 - 2000

18 Year Growth

| Funds by G*G*S Rank | G*G*S | Rank |
|---|---|---|
| Electronics | 173.53 | 1 |
| Computers | 45.94 | 2 |
| JANUS 20 | 20.78 | 3 |
| MAGELLAN | 12.67 | 4 |
| CONTRA | 12.47 | 5 |
| *S & P 500* | *1.12* | *11* |

Last 10 Years

| Funds by G*G*S Rank | G*G*S | Rank |
|---|---|---|
| Electronics | 128.65 | 1 |
| Computers | 40.03 | 2 |
| JANUS 20 | 9.26 | 3 |
| Develop Comm | 5.94 | 4 |
| Aggrsv Growth | 2.11 | 5 |
| *S & P 500* | *0.13* | *14* |

Last 5 Years

| Funds by G*G*S Rank | G*G*S | Rank |
|---|---|---|
| Electronics | 14.42 | 1 |
| Computers | 3.94 | 2 |
| JANUS 20 | 1.88 | 3 |
| Develop Comm | 0.58 | 4 |
| Div Growth | 0.50 | 5 |
| *S & P 500* | *0.06* | *12* |

Current Year 2000

| Funds by G*G*S Rank | G*G*S | Rank |
|---|---|---|
| Electronics | 0.246 | 1 |
| Div Growth | 0.117 | 2 |
| Computers | 0.102 | 3 |
| Lo Pr Stk | 0.074 | 4 |
| WINDSOR | 0.063 | 5 |
| *S & P 500* | *0.013* | *14* |

* Using the patented G*G*S Power Spectrum Analysis method

FIG. 4

MUTUAL FUND ANALYSIS METHOD AND SYSTEM

CROSS-REFERENCES TO RELATED APPLICATIONS

This application is a continuation-in-part (CIP) of U.S. patent application Ser. No. 09/675,658, filed Sep. 29, 2000, now abandoned; which claims the benefit of U.S. Provisional Patent Application Ser. No. 60/156,886, filed Sep. 30, 1999; the entire contents of which are hereby incorporated by reference in this application.

STATEMENT REGARDING FEDERALLY SPONSORED RESEARCH OR DEVELOPMENT (NOT APPLICABLE)

BACKGROUND OF THE INVENTION

The present invention relates to selecting and tracking mutual funds and, more particularly, to a method and system for comparing mutual funds according to a power spectral density that incorporates fund growth and stability.

There are three basic factors that affect the performance of a mutual fund, including fund management, market conditions and fund investment strategy. The fund manager makes the daily decisions not only on what stocks/bonds to buy, but when to buy them. Thus, market timing is often the difference between gain and loss, between one fund and another. Whether this success or failure is a matter of skill or luck is not as important as the results achieved. A profile of the fund manager is, therefore, an important piece of information that should be considered when selecting a mutual fund. The record of annual performance of funds managed by the manager in relation to funds with similar investment objectives/strategies is a good indication of the fund manager profile. Some of the better known managers are documented in mutual fund research reports, such as Mutual Fund Forecast, Ruykeyser Report, and financial newspapers (Wall Street Journal, Investor's Business Daily, etc.). The fund manager should have had experience managing the fund under consideration for at least three years, in order to establish a definable record. During that period, the fund should have out-performed competitive funds by more than five percent (5%) to be statistically meaningful.

Market conditions represent all of the factors that affect financial investments, including the flow of funds into/out of the market (supply/demand), trend of interest rates, inflation, political climate, and most importantly, the overall psychology of the investing public. While analysts tend to look at the market from a "fundamental" or "technical" perspective, one alternative view is that the dynamics of the market is driven more by human emotional factors than by any other. In 1957, for example, the stock and bond markets both lost about 3%-5% of their value in two days on news that President Eisenhower had suffered a heart attack.

Clearly, the real value of stocks had not suffered to that extent from either technical nor fundamental considerations. Similarly, when investors are worried about the job market or rising inflation (early 1970's and again in mid-late 1990's), there are usually a number of days when the market loses 5% of its value in a single day. Newspapers and TV (e.g., CNBC) financial summaries report well on this factor. Fundamental market analysis refers to the study of corporation profits, debt, cash flow, market share, growth in sales, etc.—the factors that affect the basic value of a stock or bond. Technical analysis, for purposes of this disclosure, refers to a study of the ups and downs of a stock in relation to its "200 day moving average." Technical analysis attempts to predict the direction and timing of a stock's movement, regardless of the reasons why. All of these methods have merit in evaluating stocks and bonds; they should be used in combination with one another in making the decision what to buy/sell and when to buy/sell. Mutual fund managers will apply these analyses to whole sectors (e.g., drugs, automotive, health care, etc.) of the market, sometimes concentrating an unusually large percentage of its portfolio in a few sectors that appear to present better potential for growth than all others. A fund manager must have this flexibility if it is to out-perform most other mutual funds.

Investment strategy applies to each mutual fund and can be discerned from the mutual fund prospectus. Strategies vary from aggressive growth stock funds to U.S. Government bond funds. Each investment type carries a measure of risk—ALL investments have some degree of risk to the principal amount of investment. Even bank accounts that are insured carry a finite amount of risk—risk that the insurance fund will have sufficient funds to pay off in the event of failure of the bank. Bank failures occurred frequently in 1929-32 and again in 1989-1992. The issue that must be addressed is the amount of risk that one is willing to take with the investment. To reduce the inherent risk in investing in stocks, bonds, real estate, etc., mutual fund managers develop a strategy of investing in a wide range of individual stocks, bonds, etc., so that losses due to poor performance of a few stocks will not severely degrade the overall performance of the fund. It is not uncommon for a fund to contain several hundred to a thousand stocks at any one time. Typically, the fund prospectus will indicate that the fund may not invest more than 5% of its assets in a single stock nor more than 25% in a single sector of the market. This is part of the strategy to reduce risk to the investor. Another strategy that a mutual fund uses is turnover of investments in the fund portfolio; it will use technical analysis to determine when to buy/sell its assets. It is not unusual for a fund to experience 50% to 200% turnover in assets in a single year, as the individual stocks go up and down. It is important to understand the investment strategy of the fund (objective) and of the manager (performance). The strategy of the fund and the manager is best determined by the annual performance (total return on investment) relative to the performance of similar funds (comparison tends to eliminate variances that all funds experience because of market conditions).

Analysis of the stock and bond markets by market research firms has determined that annual gains usually occur in only 25%-30% of the trading days each year. This fact should be used to temper frequent swapping of mutual funds, which occurs when a fundamentally sound mutual fund experiences some losses. This is especially true when one changes the investment from a mutual fund to money market funds; being out of the market may mean missing one or more of the big up days that occur without warning. (Unlike stocks, most mutual funds trade only at the closing price each day.)

BRIEF SUMMARY OF THE INVENTION

It is an objective of the present invention to provide a vehicle for determining which mutual fund(s) to choose and when to make changes to personal investment strategy. Given that these decisions can be highly emotionally charged, since life savings are involved, it is important to find an approach that can be followed using predetermined decisions, i.e., decisions that do not have to be analyzed at a time when losses begin to occur—and losses will occur to everyone. The trick to successful investing is to bias the ups and downs in your favor. Ideally, you want to choose investments that best satisfy two criteria:

(1) the investment should have few, if any, years of negative performance (because of investor likelihood of stopping all investment) while maximizing cumulative growth; and (2) the investment should outperform inflation, low-risk money market/CD funds, and most other funds regardless of the fund's investment objectives.

To evaluate mutual funds against these criteria, a statistical analysis must be performed. In the $18^{th}$ and $19^{th}$ centuries, the German mathematician Karl Gauss formulated statistical applications based on the probability theory invented in the $17^{th}$ century by Blaise Pascal and Pierre de Fermat.* Gaussian statistics provide the desired basis for evaluating mutual funds. This method consists of calculating the average annual growth of the fund over at least a ten (10) year period, and calculating the standard deviation of that growth over the same period. Gauss related these statistics to probability of occurrence, finding that the average occurred 50% of the time and the average plus the first standard deviation would not occur more than 32% of the time (one chance in three). Three standard deviations plus the average would not occur more than 0.3% of the time (about three chances in 1000). Using probability of occurrence as a measure of risk associated with an investment, one can determine performance limits of a fund that correspond to a desired level of risk. For younger investors, higher levels of risk are more appropriate than they are for older investors, simply because they have more years ahead of them in which to recover from temporary set backs. Thus, three standard deviations (3 sigma) might be more appropriate at retirement and one sigma when first employed. This is the foundation of the method according to the invention to evaluate mutual funds and determine appropriate investments.

Reference: The World Book Encyclopedia

When selecting mutual funds, most analysts recommend investing in no more than five (5) funds, as more funds will not reduce risk because of the broad number of stocks that each fund owns. Two or three funds, each with different investment objectives/strategies should be sufficient. For example, a balance of an aggressive growth stock fund and a balanced equity fund will lower overall risk of a down market (where growth stocks suffer the most and equity funds—those that invest in stable, dividend-paying stocks and bonds—suffer the least). That balance should be weighted more toward growth stocks for younger investors and more toward equity funds for retired investors—retired investors should still retain at least 15%-25% of total investment in growth stocks to guard against periods of very high inflation, when equity funds typically fall the most.

This invention is unique in at least two respects. First, this invention incorporates a power spectrum engineering analysis technique that may not be apparent to most personnel in the financial world (e.g., analysts, fund managers, etc.). Bridging the gap from engineering to financial domains is an important aspect of the invention. Second, this invention incorporates probability and statistical analysis in a way not heretofore documented or disclosed. The utility of probability and statistical analysis as claimed herein provides investors with specific guidance that is useful in the timing of buying and selling investments for near-optimum results—investments of all types, not just mutual funds.

In accordance with an exemplary embodiment of the invention, a method of comparing mutual funds includes determining a power spectral density (PSD) of respective mutual funds according to fund cumulative growth (G) and fund stability (S). The mutual funds are ranked from highest to lowest power spectral density. The step of determining the power spectral density is preferably practiced by multiplying the square of the fund cumulative growth by the fund stability, such that $PSD=G^2 \cdot S$. In this context, the fund stability is determined according to $S=Avg-StdDev$, where Avg is the average annual growth over a predetermined period, and StdDev is one standard deviation of the annual growth over the predetermined period.

The method may further include tracking a selected mutual fund according to upper and lower control limits that are determined based on a standard deviation of the selected mutual fund performance average. Tracking the selected mutual fund is preferably practiced using two different time periods, called "tracks." The first track is preferably a global (or long term) track, preferably 10 or more years in annual increments, wherein the method further includes determining upper and lower control limits for the global track based on a standard deviation of the selected mutual fund annual performance average over multiple years of performance data. Similarly, the second track is preferably a current track of one to three years in daily increments, wherein the method further includes determining upper and lower control limits for the current track based on a standard deviation of the selected mutual fund daily performance average over multiple days of performance data. The upper and lower control limits may be determined based on two standard deviations of the selected mutual fund performance average, and timing of an investment or divestment in the selected mutual fund can be determined according to a price of the selected mutual fund relative to the upper and lower control limits.

In accordance with another exemplary embodiment of the invention a method of comparing mutual funds includes determining a power spectral density (PSD) of respective mutual funds according to a product of a principle factor squared times fund stability (S). The mutual funds are ranked from highest to lowest power spectral density.

In accordance with yet another exemplary embodiment of the invention, a system for comparing mutual funds includes structure for determining a power spectral density (PSD) of respective mutual funds according to fund cumulative growth (G) and fund stability (S), and structure for ranking the mutual funds from highest to lowest power spectral density.

BRIEF DESCRIPTION OF THE DRAWINGS

These and other aspects and advantages of the present invention will be described in detail with reference to the accompanying drawings, in which.

DETAILED DESCRIPTION OF THE INVENTION

In the description below, as would be apparent to those of ordinary skill in the art, the described calculation and graphical representations are performed by a computer or other automated means.

In accordance with the present invention, a power spectral density analysis is applied to mutual fund historical data to compare, rank, select and track mutual funds. A power spectrum of density is created from data (such as annual growth performance of a mutual fund) and plotted over the entire fund-spectrum to determine peak occurrences. As used in communications and structures, the spectrum of frequency is created to locate via peaks in the power spectral density plot) resonant frequencies. As applied to mutual fund data, key attributes of mutual funds such as cumulative growth and stability over the spectrum of possible mutual funds are used to locate the best performing fund(s).

The term "power" in power spectral density (PSD) implies the square of the principal factor, based on engineering principles. Preferably, the principal factor is cumulative growth (G) of the fund since the inception of the fund or over some other predetermined period of time. Although cumulative growth is a preferred principal factor, other principal factors may include annual total return as a percentage of principal investment, and "beta" (the ratio of an investment's performance to a standard index (such as the S&P 500 or Wiltshire 5000 or Dow 30 Industrials, etc.)).

Stability (S) is also an important factor in determining the power spectral density. In the context of a mutual fund, stability equals the average annual growth of the fund over a set period of time, preferably at least a ten year period, minus a standard deviation of that growth over the same period.

The power spectral density (PSD) is thus determined according to the following relation:

$$PSD = G^2 \cdot S,$$

where G is the cumulative growth of the fund over a set period of time, and S is the stability of the fund as discussed above.

As an illustrative example, the annual performance of the largest mutual fund in America, Fidelity Magellan (more than $100 billion in assets in 1999) will be analyzed.

| Yr-ending | % Growth |
|---|---|
| 1983 | 9% |
| 1984 | 2% |
| 1985 | 43% |
| 1986 | 24% |
| 1987 | 1% |
| 1988 | 23% |
| 1989 | 35% |
| 1990 | −5% |
| 1991 | 41% |
| 1992 | 7% |
| 1993 | 25% |
| 1994 | −2% |
| 1995 | 37% |
| 1996 | 12% |
| 1997 | 26% |

-continued

| Yr-ending | % Growth |
|---|---|
| 1998 | 33% |
| 1999 | 23% |
| 2000 | incomplete year |

1983-1999
17 Yr Avg = 19.6%      17    34.6%
Std Deviation = 15.0%         4.6%
1995-1999
Avg in last 5 Yrs = 26.2%    6.6%  34.8%
Std Deviation = 8.6%        −13.1%  17.6%
NOTE:
data are obtained from Magellan prospectus, Fidelity, Inc.
* Fund over-weighted its holdings in Bonds, performing poorly (Fund Manager replaced)

Two periods are examined: a 17 year long term and the most recent five years. Comparing results from those two periods indicates consistency of performance, especially when compared with similar analysis for other funds. For the 17 year period, one sigma limits (not likely to be exceeded more than 33% of the time) are (Avg+Std Dev and Avg−Std Dev) 34.6% and 4.6%. Thus, one can expect that Magellan will not achieve more than a 34.6% return nor less than 4.6% in one year more than 33% of the time. In fact, Magellan exceeded 34.6% four times in those 17 years (1985, 1989, 1991, and 1995)—or 23.5% (4/17 ths) of the time. It achieved less than 4.6% four times (1984, 1987, 1990 and 1994), for a 23.5% accomplishment. Both occurrences are well within the determined limits. As noted, the lower limit, Avg−Std Dev, is a good indicator of mutual fund performance and satisfies the second of the two criteria listed above, i.e., stability. The first criterion, cumulative growth, G, of the fund, is calculated by multiplying the annual growth factors together: (1+0.0900)(1+0.0203) . . . (1+0.234)−1=1729.4%. Thus, a $1,000 investment at the beginning of 1983 would be worth about $17,000 at the end of 1999. Ultimately, this is the only factor that matters at retirement; but, along the way, many investors drop out of the investment when large negative performance occurs. It is this reason that Gaussian statistics are so important—they forecast ahead of time what to expect, especially on the downside, so that the investor does not become unduly discouraged and drop-out.

Looking at the most recent five years for comparison, note that the average increased approx. 6.6% and the standard deviation is smaller than the average. Thus, the lower limit, Avg−Std Dev, is 17.6%. In order to bias the investment game in your favor, the following stability rule should be followed:

$$\text{Avg} - \text{Std Dev} > 0$$

for any five year period. Applying this rule would have resulted in switching from Magellan to a better performing fund in 1994. Some analysts believe that Magellan has not lived up to past performance because (a) the fund manager was changed in 1992, and/or (b) the fund has grown so large, $100 billion, that it cannot possibly continue to achieve the rapid growth of the 1980's because of the fund by-laws limiting its investments to not more than 5% in any one stock, even though it might be apparent that one or two stocks are very hot performers. Fund size influences performance. (NOTE: Magellan changed fund managers again in June 1996; since then, its performance has improved considerably.)

Figure 1:
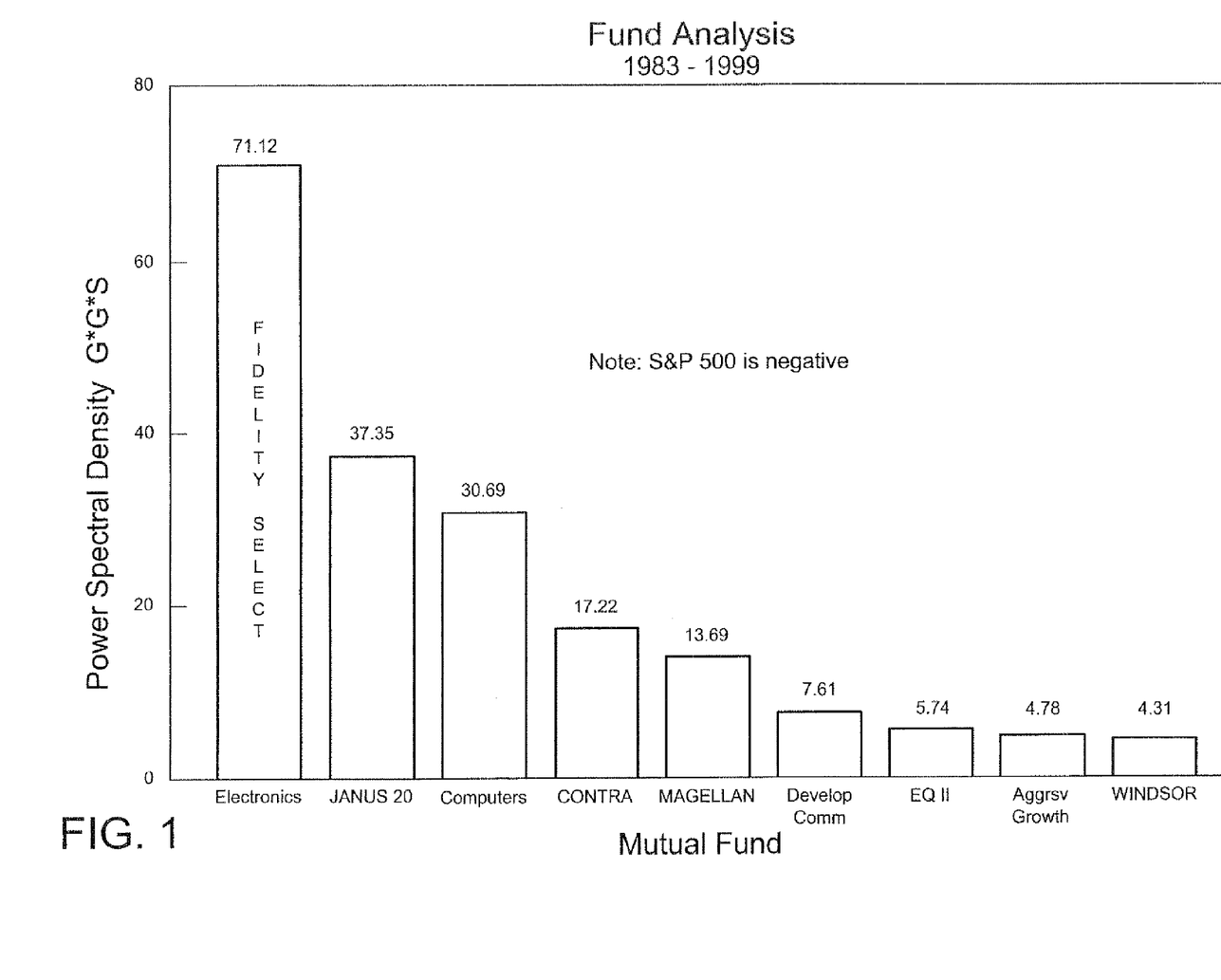
FIG. 1 is a chart showing the power spectral density of several mutual funds.

Applying the PSD analysis to a number of highly regarded mutual funds gives the best recommendation of which fund(s) to own, with least risk. See FIG. 1. As shown in FIG. 1, the Fidelity Electronics Fund has one of the best PSD ratings of all stock mutual funds. (Fidelity Select-Computers and Janus 20 funds are very similar in holdings to Electronics.) The Fidelity ContraFund is currently closed to investors, keeping that fund limited in size so that it can continue to achieve its excellent record of growth without having the fund become too large. (Remember, fund size affects performance.) The next best fund, after ContraFund, is the Fidelity Magellan fund, which has returned to high performance since changing its management. The Merrill Lynch Growth fund has been another top performer over the years. In October 1997, the Merrill Lynch Fund manager over-weighted (42%) the fund portfolio with stocks in the oil and energy sector. That sector of our economy has performed poorly since that October 1997 move; consequently, the Merrill Lynch Growth Fund has lost approximately 20%-25% in value since then (while other stock growth funds have GAINED 20%-25% during that same period through 1999). Even the best of funds can make mistakes, and thus, it is important to track fund performance, to observe unexpected changes in time to make adjustments before losing significant value. A time-history comparison of funds is an important tool used to spot those funds that are performing poorly compared to other funds that are rising with the market. When that happens, it may be time for a change.

The basis for tracking investments developed using the method according to the invention is also a statistical analysis applied to past history of the investment. While there can be no guarantee that future performance will be indicative of past history, statistical analysis can provide the probability that the investment can repeat that history. Normal (Gaussian) probability analysis can be applied to investments found in the U.S. securities markets, even though specific investments such as stocks and mutual funds show a marked positive (upward) bias over a long period of time. This positive bias is the steady-state component of a complex total response to various market stimuli that includes a truly random component.

Investments are preferably tracked on two different time scales. A global track on the one hand is the annual total return produced by the investment, tracked annually for as many years as data is available (10 or more years, if possible). It is for this reason that investments that are new to the marketplace, have no history, cannot be predictable and are to be avoided because the risk is unknown, i.e., cannot be meaningfully calculated. A current track time scale on the other hand is daily tracking for a sufficient time period that trends can be obtained (usually one to three years).

In each case, the average of the annual performance and its standard deviation is calculated to establish upper and lower control limits. Normal probability tables will provide the relationship between standard deviations (sigma) and probability of occurrence. Usually, one sigma (68% probable) or two sigma (95.5% probable)—three sigma (greater than 99% probable) is too restrictive for investing—is used, depending on the degree of risk tolerance of the investor. Applying, say two sigma, plus and minus variations to the performance average of the investment will produce these control limits within which the investment is bounded, at least, to the extent of the probability that corresponds to the selected number of standard deviations. (In this example of two sigma, the probability that the investment will exceed the control limits is less than 4.5% (i.e., 100% -95.5%)—approximately one chance in 20). While this method is not absolute or perfect, it nonetheless improves the chance of the investor achieving a profit as well as a near optimum performance.

Figure 2:
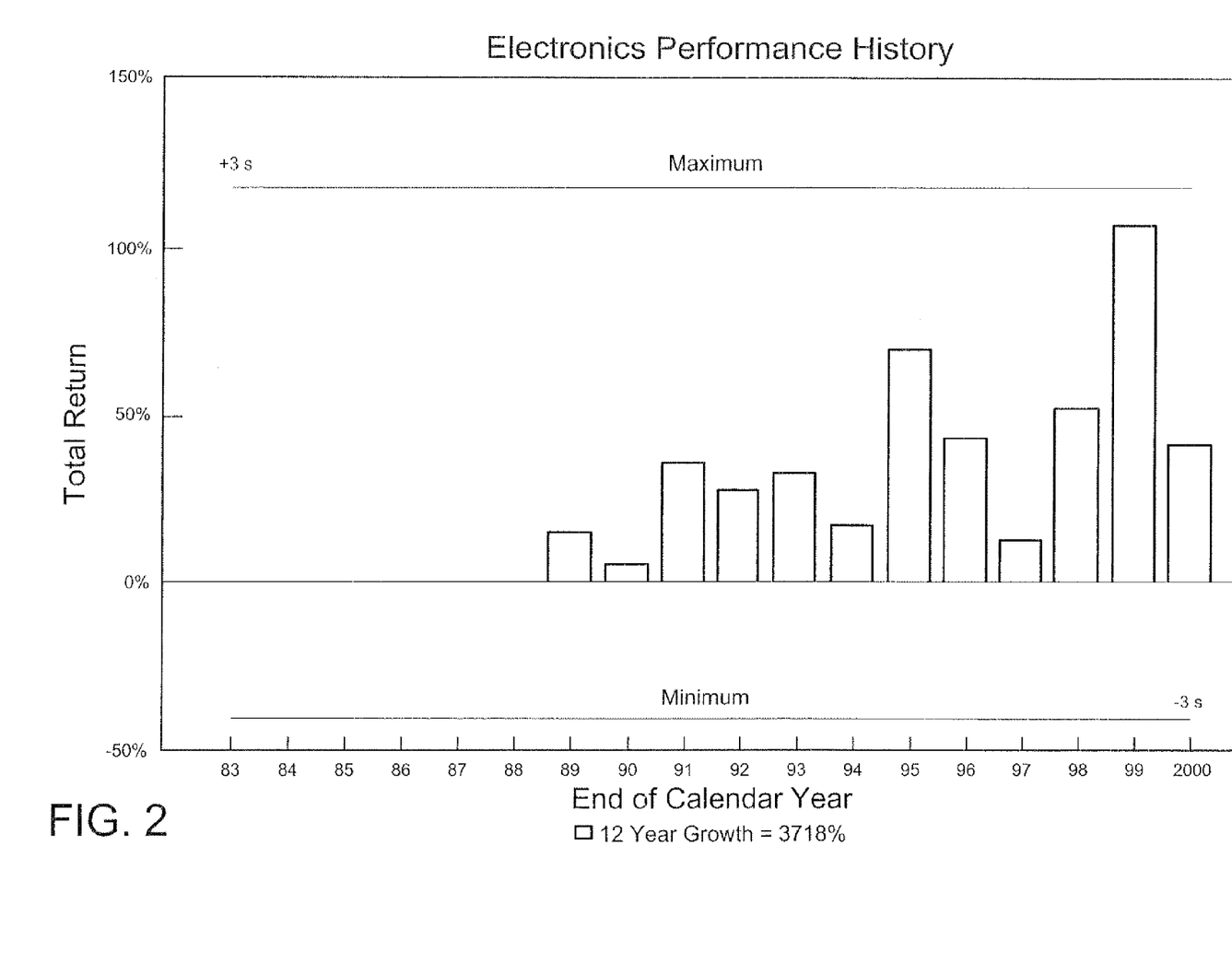
FIG. 2 is a chart of an exemplary mutual fund showing mutual fund global tracking.

In global tracking, the annual performance results are averaged over the number of years for the data. The control limits are calculated, as described above, and added to the plot of investment performance versus time in years. Should the current year's performance reach either control limit, it is unlikely (1 chance in 20, in the example) that the investment will proceed further in that direction; if the investment reaches/approaches an upper control limit, it is time to divest that investment and move on to another, whereas if the investment reaches/approaches a lower control limit, it is time to invest in that investment. An example of global tracking is illustrated in FIG. 2 in the exemplary context of the Fidelity Select Electronics Fund.

Figure 3:
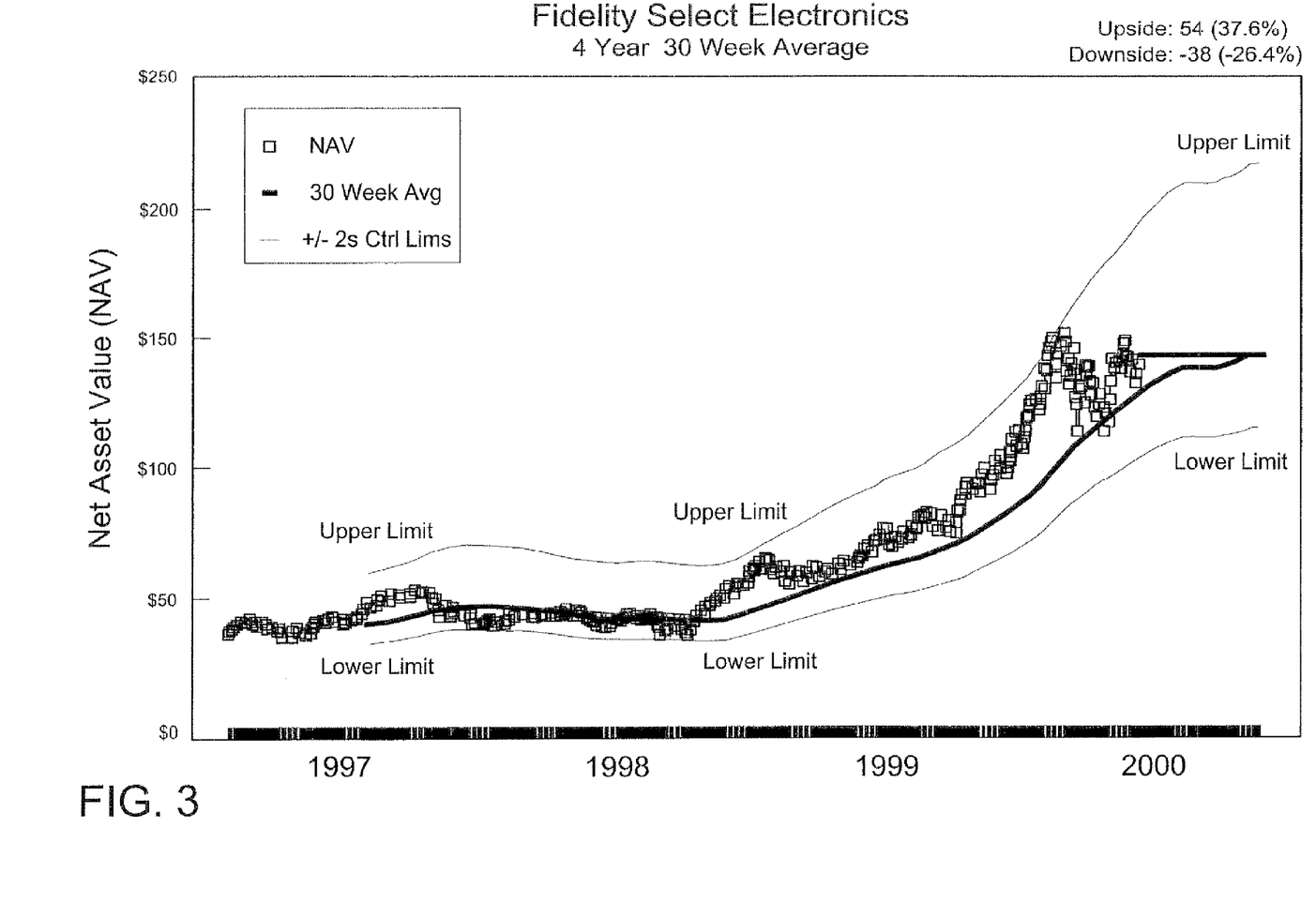
FIG. 3 is a chart corresponding to FIG. 2 showing current tracking.
Figure 4:
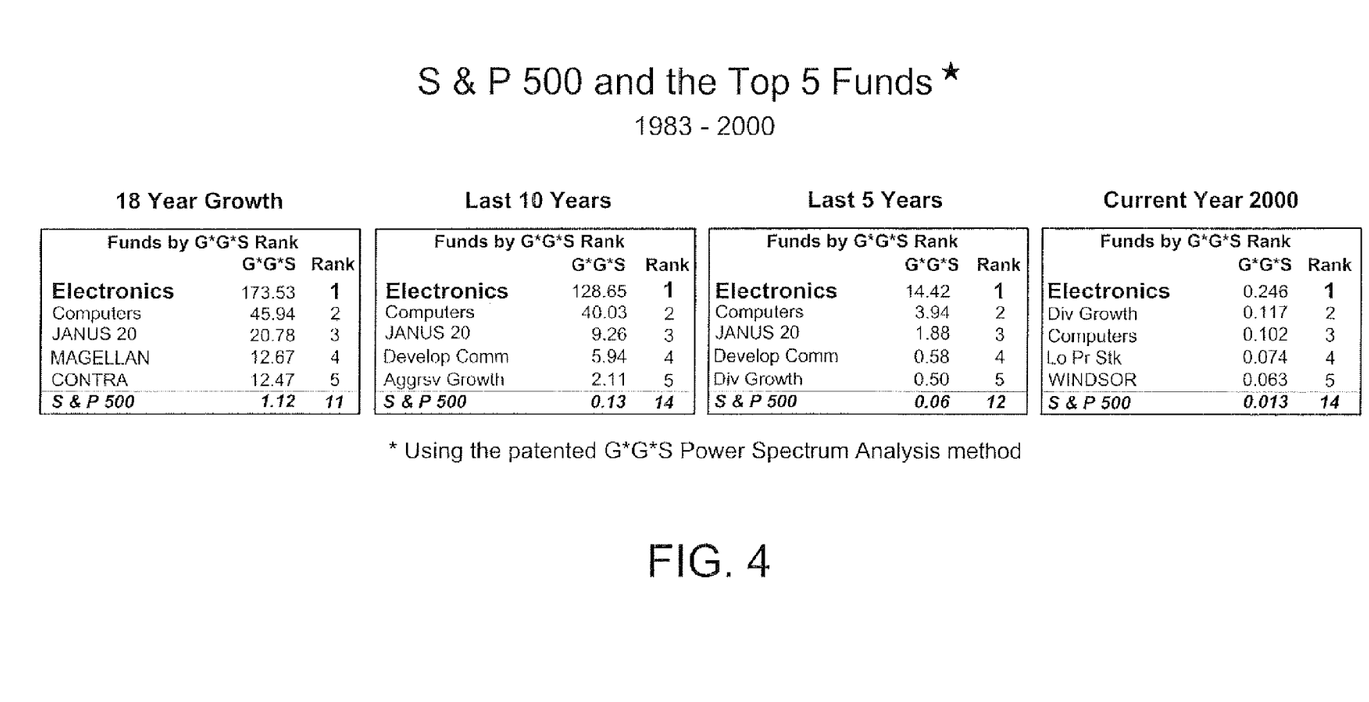
FIG. 4 is a chart ranking mutual funds by PSD value.

Similar to global tracking, current tracking uses the average of daily performance of the investment. In this case, one must decide how many days of performance to include in the average. The investment community typically uses a 200 day (approximately 30 weeks) "moving" average. The investment is then tracked against this moving average. The further away from the 200 day moving average that the investment moves, the greater the probability becomes that it will reverse direction. A record is kept of the peak positive and negative dispersions from the moving average. These peaks are then averaged and a standard deviation is computed. Again, a number of standard deviations (sigma) are selected from which to construct control limits around the 200 day moving average. Performance of the investment can then be tracked daily to ensure that it does not go beyond the established control limits. This daily current tracking is illustrated in FIG. 3. Ranking of selected mutual funds by PSD value using this present invention is shown in FIG. 4.

With the subject matter of the present invention, a statistical analysis is provided to compare, rank and select mutual funds based on a power spectral density of the respective funds, and investment tracking helps investors achieve near optimum performance. The analysis incorporates a principal factor such as cumulative growth and stability for comparing mutual funds while establishing upper and lower control limits to optimize performance.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims. In this context, this invention has much broader applicability than just to mutual funds. The power spectrum and probability/statistical method contained herein can be applied to virtually anything for which sufficient historical data are available for analysis. Some other applications include: real estate transactions, medical data, automotive resale, farm commodities, energy pricing, just to name a few examples.

The invention claimed is:

1. A method of comparing mutual funds utilizing computer processing structure, the method comprising:
   determining with the computer processing structure a power spectral density (PSD) of respective mutual funds according to fund cumulative growth (G) and fund stability (S);
   ranking the mutual funds from highest to lowest power spectral density; and
   referencing the mutual fund ranking for guiding investors in buying and selling mutual funds.

2. A method according to claim 1, wherein the step of determining the power spectral density is practiced by multiplying the square of the fund cumulative growth by the fund stability, such that $PSD=G^2 \cdot S$.

3. A method according to claim 2, wherein the step of determining the power spectral density is practiced by determining the fund stability according to $S=Avg-StdDev$, where Avg is an average annual growth over a predetermined period, and StdDev is a standard deviation of the annual growth over the predetermined period.

4. A method according to claim 1, further comprising tracking a selected mutual fund according to upper and lower control limits that are determined based on a standard deviation of the selected mutual fund performance average.

5. A method according to claim 4, wherein the step of tracking the selected mutual fund is practiced on two tracks including a first track over a first period of time and a second track over a second period of time, shorter than the first period of time.

6. A method according to claim 5, wherein the first track is a global track and the first period of time is one year, the method further comprising determining upper and lower control limits for the global track based on a standard deviation of the selected mutual fund annual performance average over multiple years of performance data, and wherein the second track is a current track and the second period of time is one day, the method further comprising determining upper and lower control limits for the current track based on a standard deviation of the selected mutual fund daily performance average over multiple days of performance data.

7. A method according to claim 4, wherein the tracking step is practiced by determining the upper and lower control limits based on two standard deviations of the selected mutual fund performance average.

8. A method according to claim 7, further comprising timing an investment or divestment in the selected mutual fund according a price of the selected mutual fund relative to the upper and lower control limits.

9. A method of comparing mutual funds utilizing computer processing structure, the method comprising:
determining with the computer processing structure a power spectral density (PSD) of respective mutual funds according to a product of a principle factor squared times fund stability (S);
ranking the mutual funds from highest to lowest power spectral density; and
referencing the mutual fund ranking for guiding investors in buying and selling mutual funds.

10. A method according to claim 9, wherein the principle factor is cumulative growth.

11. A method according to claim 9, wherein the step of determining the power spectral density is practiced by determining the fund stability according to $S=Avg-StdDev$, where Avg is an average annual growth over a first predetermined period, and StdDev is a standard deviation of the annual growth over the first predetermined period.

12. A method according to claim 9, further comprising tracking a selected mutual fund according to upper and lower control limits that are determined based on a standard deviation of the selected mutual fund performance average.

13. A method according to claim 12, wherein the step of tracking the selected mutual fund is practiced on two tracks including a first track over a first period of time and a second track over a second period of time, shorter than the first period of time.

14. A method according to claim 13, wherein the first track is a global track and the first period of time is one year, the method further comprising determining upper and lower control limits for the global track based on a standard deviation of the selected mutual fund annual performance average over multiple years of performance data, and wherein the second track is a current track and the second period of time is one day, the method further comprising determining upper and lower control limits for the current track based on a standard deviation of the selected mutual fund daily performance average over multiple days of performance data.

15. A method according to claim 12, wherein the tracking step is practiced by determining the upper and lower control limits based on two standard deviations of the selected mutual fund performance average.

16. A method according to claim 15, further comprising timing an investment or divestment in the selected mutual fund according a price of the selected mutual fund relative to the upper and lower control limits.

17. A computer system for comparing mutual funds comprising:
means for determining a power spectral density (PSD) of respective mutual funds according to fund cumulative growth (G) and fund stability (S);
means for ranking the mutual funds from highest to lowest power spectral density; and
means for referencing the mutual fund ranking for guiding investors in buying and selling mutual funds.

18. A system according to claim 17, wherein the power spectral density is determined by multiplying the square of the fund cumulative growth by the fund stability, such that $PSD=G^2 \cdot S$.

19. A system according to claim 18, wherein the fund stability $(S)=Avg-StdDev$, where Avg is an average annual growth over a predetermined period, and StdDev is a standard deviation of the annual growth over the predetermined period.

20. A system according to claim 17, further comprising means for tracking a selected mutual fund according to upper and lower control limits that are determined based on a standard deviation of the selected mutual fund performance average.

21. A method of comparing investments utilizing computer processing structure, the method comprising:
determining with the computer processing structure a power spectral density (PSD) of respective investments according to investment cumulative growth (G) and investment stability (S);
ranking the investments from highest to lowest power spectral density; and
referencing the investment ranking for guiding investors in buying and selling investments.

22. A method of comparing mutual funds comprising:
determining a power spectral density (PSD) of respective mutual funds according to fund cumulative growth (G) and fund stability (S);
ranking the mutual funds from highest to lowest power spectral density; and
referencing the mutual fund ranking for guiding investors in buying and selling mutual funds.

23. A method according to claim 22, wherein the step of determining the power spectral density is practiced by multiplying the square of the fund cumulative growth by the fund stability, such that PSD=$G^2 \cdot S$.

24. A method of comparing mutual funds comprising:
determining a power spectral density (PSD) of respective mutual funds according to a product of a principle factor squared times fund stability (S);
ranking the mutual funds from highest to lowest power spectral density; and
referencing the mutual fund ranking for guiding investors in buying and selling mutual funds.

* * * * *